Nov. 19, 1929.  W. PEACOCK  1,736,667
MIRROR
Filed April 18, 1927
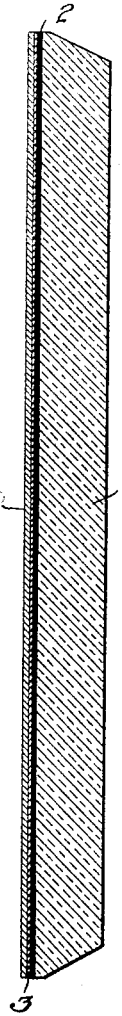
Inventor
William Peacock
Keller & Mechlin
his Attorneys Patented Nov. 19, 1929

1,736,667

UNITED STATES PATENT OFFICE

WILLIAM PEACOCK, OF LITITZ, PENNSYLVANIA, ASSIGNOR TO WOOLWORTH CHEMICAL COMPANY, OF LITITZ, PENNSYLVANIA, A CORPORATION OF PENNSYLVANIA

MIRROR

Application filed April 18, 1927. Serial No. 184,614.

My invention relates to mirrors. Generally stated, the mirror consists of a suitable sheet of glass or transparent material to the rear surface of which is applied a film or coating of an organic substance exhibiting a sheen or luster of metallic appearance. This reflecting film is covered by a protecting coating to render the finished mirror capable of withstanding the effects of weather and the usual commercial abuse. Mirrors involving the invention may be produced much more cheaply than those in which the reflecting coating is a metallic substance, and they are particularly suitable for use as rear vision mirrors of automobiles where it is desirable that the images of all objects reflected thereby shall be clear and strong but of a substantially reduced intensity so that the glare of bright objects is eliminated to a degree sufficient to prevent any serious difficulty of clear vision or strain or fatigue of the eyes. The amount of light reflected by a mirror having a reflecting coating of the character indicated will of course vary with the percentage of light absorbed by the organic material.

In the accompanying drawing showing a cross sectional view of a mirror embodying the invention, 1 is a piece of plate glass having in optical contact with its rear face an organic reflecting coating or film 2 which is overlaid by a protecting backing preferably consisting of an inner waterproof coating 3 of paint in contact with the reflecting film 2 and a ceramic coating or layer 4. Any suitable paint or varnish which will not injure the reflecting coating may be employed. The ceramic coating may be applied with a brush in the usual manner.

Analine dyes or dyes derived from coal tar bases are preferably employed as the organic reflecting coating of lustrous metallic appearance, the particular dye chosen for the coating being governed to a considerable extent by the percentage of light it is desired the mirror shall reflect, for, as is well known, the light absorbing qualities of different dyes vary. Thus a coating of fluorescein produces too bright a reflecting image to give the most desirable results in a rear vision mirror, but it is obvious that a mirror producing an insufficient darkening effect or too great a darkening effect to be desirable for a given use may well be suitable for some other purpose. Eosin, fuchsin and magenta, especially the latter, produce suitable reflecting surfaces or coatings for rear vision mirrors for automobiles, as they absorb enough light to produce a sufficient darkening effect. A mirror having a coating of magenta reflects approximately $11\frac{8}{10}$ per cent of the light emanating from the source. This is sufficient for the production of clear and strong images of all objects reflected in the mirror, while at the same time eliminating unpleasant or blinding glare. A magenta coated mirror is also particularly desirable in that the green metallic sheen of its reflecting surface is pleasing to the eye.

Variations in the intensity of the reflections may easily be effected by forming the reflecting coating from combinations of the dyes. Thus, for example, methyl violet, which alone reflects somewhat more light than is desirable in the case of a rear vision mirror, may be mixed with magenta to produce a coating reflecting a percentage of light intermediate of the amounts respectively reflected by those two materials.

The organic compound which is to form the desired reflecting coating, as for example magenta, is dissolved in a volatile solvent, preferably ethyl alcohol, to form a saturate solution, saturation being promoted by raising the temperature of the solution to about 95° F. Before this coating solution is applied to the glass the latter is washed and dried and then heated in an oven to about 100° F. In cleaning the glass a strong alkali is preferably first employed to remove any grease, followed by nitric acid to eliminate any inert substance not removed by the alkali, and then the glass is rinsed in water.

The coating solution or mixture, preferably while at a temperature of 95° F., is then applied to the rear surface of the glass in any convenient manner by spraying, brushing or flowing it on or by applying it in any other suitable manner. When coming in contact with the glass the heat of the latter causes the volatile solvent to evaporate rapidly, leaving upon the glass an even deposition of the organic matter. The reflecting film thus deposited on the glass is then covered with the protecting backing and the mirror is complete.

I claim:—

A mirror having a reflecting coating embodying magenta dye.

In testimony whereof I affix my signature.

WILLIAM PEACOCK.